(12) United States Patent
DeLaVergne (10) Patent No.: US 7,815,099 B2
(45) Date of Patent: Oct. 19, 2010

(54) REUSABLE ENVELOPE STRUCTURES AND METHODS

(75) Inventor: Carol A. DeLaVergne, Stillwater, MN (US)

(73) Assignee: Ecoenvelopes, LLC, Minneapolis, MN (US)

( * ) Notice: Subject to any disclaimer, the term of this patent is extended or adjusted under 35 U.S.C. 154(b) by 1174 days.

(21) Appl. No.: 11/397,770

(22) Filed: Apr. 4, 2006

(65) Prior Publication Data

US 2006/0219769 A1      Oct. 5, 2006

Related U.S. Application Data

(60) Provisional application No. 60/668,662, filed on Apr. 5, 2005.

(51) Int. Cl.
*B65D 27/06* (2006.01)
*B65D 27/00* (2006.01)

(52) U.S. Cl. ................... 229/301; 229/305; 229/70

(58) Field of Classification Search ............... 383/300, 383/301, 304, 305, 70
See application file for complete search history.

(56) References Cited

U.S. PATENT DOCUMENTS

| | | |
|---|---|---|
| 192,522 A | 6/1877 | Marshall |
| 759,382 A | 5/1904 | Klugh |
| 886,449 A | 5/1908 | West |
| 932,715 A | 8/1909 | Morrison |
| 1,145,935 A | 7/1915 | Steinke |
| 1,173,869 A | 2/1916 | Rougeux |
| 1,187,258 A | 6/1916 | Carr et al. |
| 1,245,447 A | 11/1917 | Felenchak |
| 1,438,122 A | 12/1922 | McCoy |
| 1,953,192 A | 4/1934 | Rossiter |
| 1,957,704 A | 5/1934 | Drachman |
| 1,960,054 A | 5/1934 | Johnson |
| 1,988,908 A | 1/1935 | MacKinnon |
| 2,129,705 A * | 9/1938 | Reineman ............ 229/81 |
| 2,201,538 A | 5/1940 | Holden |
| 2,310,371 A | 2/1943 | Lines et al. |
| 2,340,700 A | 2/1944 | Sawdon |
| 2,350,100 A | 5/1944 | Deutschmeister et al. |
| 2,363,957 A | 11/1944 | Goff |
| 2,400,406 A | 5/1946 | Godoy |
| 2,928,583 A | 3/1960 | Law |
| 2,941,711 A | 6/1960 | Biek |
| 2,954,154 A | 9/1960 | Stuart |

(Continued)

FOREIGN PATENT DOCUMENTS

CA         2075214      12/1993

(Continued)

*Primary Examiner*—Jes F Pascua
(74) *Attorney, Agent, or Firm*—Albert W. Watkins (57) ABSTRACT

The present invention provides reusable envelope structures that also provide advertising, promotional or other correspondence functions as well as methods of use thereof. In preferred aspects, the present invention provides envelope structures in which a single envelope structure can provide multiple uses. A reusable envelope structure in accordance with the present invention comprises a reusable flap and a removable portion that may comprise a coupon or similar advertising, promotional or correspondence device. An envelope in accordance with the present invention is designed so that removal of the removable portion also functions to open the envelope a first time by the reusable flap. The envelope can be reused by closing the envelope a second time with the reusable flap.

15 Claims, 5 Drawing Sheets

U.S. PATENT DOCUMENTS

| | | |
|---|---|---|
| 3,062,431 A | 11/1962 | Rabenold |
| 3,086,695 A | 4/1963 | Lillibridge |
| 3,111,257 A | 11/1963 | Peach |
| 3,113,716 A | 12/1963 | Howard |
| 3,152,751 A | 10/1964 | Hiersteiner |
| 3,184,150 A | 5/1965 | Hubbard |
| 3,227,360 A | 1/1966 | Krueger |
| 3,261,623 A | 7/1966 | Kiedrowski |
| 3,276,669 A | 10/1966 | Vilutis |
| 3,374,940 A * | 3/1968 | Allison ................. 229/70 |
| 3,380,648 A | 4/1968 | Lyra |
| 3,411,699 A | 11/1968 | Pine et al. |
| 3,426,961 A * | 2/1969 | Allison ................. 229/70 |
| 3,498,528 A | 3/1970 | Klein |
| 3,531,046 A * | 9/1970 | Carrigan ................. 229/72 |
| 3,537,637 A | 11/1970 | Hiersteiner |
| 3,545,669 A | 12/1970 | Kinkade et al. |
| 3,652,007 A * | 3/1972 | MacDougall ............... 229/304 |
| 3,693,869 A | 9/1972 | Eaves, Jr. |
| 3,747,837 A | 7/1973 | Wilson |
| 3,802,618 A | 4/1974 | Wiessner |
| 3,822,492 A | 7/1974 | Crawley |
| 3,874,582 A | 4/1975 | Wang |
| 3,910,410 A | 10/1975 | Shaw |
| 3,979,051 A | 9/1976 | Close |
| 3,982,689 A | 9/1976 | Retrum |
| 4,157,759 A | 6/1979 | Dicker |
| 4,159,129 A | 6/1979 | Lockhart |
| 4,180,168 A | 12/1979 | Hiersteiner |
| 4,190,161 A | 2/1980 | Gendron |
| 4,190,162 A | 2/1980 | Buescher |
| 4,194,631 A | 3/1980 | Rangan |
| 4,245,775 A | 1/1981 | Conn |
| 4,288,028 A | 9/1981 | Diaz |
| 4,308,987 A | 1/1982 | Solomon |
| 4,332,346 A | 6/1982 | Kronman |
| 4,354,631 A | 10/1982 | Stevenson |
| 4,379,573 A | 4/1983 | Lomeli et al. |
| 4,382,539 A | 5/1983 | Kronman |
| 4,403,696 A | 9/1983 | Newell |
| 4,436,202 A | 3/1984 | Berkley |
| 4,487,360 A | 12/1984 | Fisher et al. |
| 4,549,658 A | 10/1985 | Sfikas |
| 4,565,317 A | 1/1986 | Kranz |
| 4,602,736 A | 7/1986 | Barr |
| 4,620,630 A | 11/1986 | Moss |
| 4,640,030 A | 2/1987 | Wood et al. |
| 4,651,920 A | 3/1987 | Stenner |
| 4,653,639 A | 3/1987 | Traynor |
| 4,688,715 A | 8/1987 | Barr |
| 4,690,322 A | 9/1987 | Burns |
| 4,715,531 A | 12/1987 | Stewart et al. |
| 4,775,095 A | 10/1988 | Emmott |
| 4,778,100 A | 10/1988 | McGuire et al. |
| 4,778,101 A | 10/1988 | Paquin |
| 4,821,439 A | 4/1989 | Wilck |
| 4,896,823 A | 1/1990 | Taylor |
| 4,899,926 A | 2/1990 | Spaulding |
| 4,917,287 A | 4/1990 | Watson |
| 4,927,072 A | 5/1990 | Jenkins et al. |
| 4,934,536 A | 6/1990 | Mills |
| 4,944,449 A | 7/1990 | Schmidt |
| 4,945,218 A | 7/1990 | Talbott |
| 4,960,237 A | 10/1990 | Bendel |
| 4,981,251 A | 1/1991 | Jenkins et al. |
| 4,993,624 A | 2/1991 | Schlich |
| 5,024,374 A | 6/1991 | Ashby |
| 5,025,980 A | 6/1991 | Blackman |
| 5,039,000 A | 8/1991 | Ashby |
| 5,040,720 A | 8/1991 | Pennock |
| 5,052,613 A | 10/1991 | Lin |
| 5,071,167 A | 12/1991 | O'Brien |
| 5,071,399 A | 12/1991 | Ashby |
| 5,104,036 A | 4/1992 | Rutkowski et al. |
| 5,110,043 A | 5/1992 | Ashby |
| 5,118,030 A | 6/1992 | McNamara et al. |
| 5,118,031 A | 6/1992 | Tighe |
| 5,125,562 A | 6/1992 | Bendel |
| 5,163,612 A | 11/1992 | Ashby |
| 5,197,663 A | 3/1993 | Stude |
| 5,201,464 A | 4/1993 | File |
| 5,209,698 A | 5/1993 | Dolan |
| 5,213,258 A | 5/1993 | Kim |
| 5,224,647 A | 7/1993 | Yanow |
| 5,232,150 A | 8/1993 | Solomons |
| 5,248,032 A | 9/1993 | Sheu et al. |
| 5,251,810 A | 10/1993 | Kim |
| 5,253,803 A | 10/1993 | Chess |
| 5,271,553 A | 12/1993 | Kim |
| 5,277,362 A | 1/1994 | Wilson |
| 5,282,568 A | 2/1994 | File |
| 5,292,062 A | 3/1994 | Chess |
| 5,299,979 A | 4/1994 | Ballard |
| 5,307,989 A | 5/1994 | Dyer |
| 5,318,222 A | 6/1994 | Bartlett |
| 5,324,927 A | 6/1994 | Williams |
| 5,333,909 A | 8/1994 | Hedge, Jr. |
| 5,383,686 A | 1/1995 | Laurash |
| 5,400,957 A | 3/1995 | Stude |
| 5,415,341 A | 5/1995 | Diamond |
| 5,431,337 A | 7/1995 | Bell |
| 5,487,566 A | 1/1996 | Hedge, Jr. |
| 5,487,826 A | 1/1996 | Back et al. |
| 5,501,393 A | 3/1996 | Walz |
| 5,503,328 A | 4/1996 | Roccaforte et al. |
| 5,510,608 A | 4/1996 | Williams |
| 5,514,863 A | 5/1996 | Williams |
| 5,516,040 A | 5/1996 | Lin |
| 5,520,990 A | 5/1996 | Rotermund |
| 5,547,227 A | 8/1996 | Laurash et al. |
| 5,570,835 A | 11/1996 | Sung et al. |
| 5,626,286 A | 5/1997 | Petkovsek |
| 5,626,370 A | 5/1997 | Petkovsek |
| 5,662,420 A | 9/1997 | Sinda et al. |
| 5,687,904 A | 11/1997 | Potter |
| 5,690,220 A | 11/1997 | Swan |
| 5,697,496 A | 12/1997 | Bauer |
| 5,704,543 A | 1/1998 | Pollanen |
| 5,713,511 A | 2/1998 | Diamond |
| 5,722,538 A | 3/1998 | Neely et al. |
| 5,738,274 A | 4/1998 | Stude |
| 5,752,647 A | 5/1998 | Schubert et al. |
| 5,823,423 A | 10/1998 | Murray |
| 5,826,787 A | 10/1998 | Turner |
| 5,875,964 A | 3/1999 | Pham |
| 5,887,780 A | 3/1999 | Popat et al. |
| 5,887,904 A | 3/1999 | Ketkovsek |
| 5,901,843 A | 5/1999 | Gambardella et al. |
| 5,901,844 A | 5/1999 | Gambardella et al. |
| 5,909,805 A | 6/1999 | Neely |
| 5,929,415 A | 7/1999 | Berson |
| 5,950,916 A | 9/1999 | Santangelo |
| 5,967,403 A | 10/1999 | Kranz |
| 6,053,855 A | 4/2000 | Stenner |
| 6,059,316 A | 5/2000 | Whittington |
| 6,129,269 A | 10/2000 | Tait |
| 6,155,481 A | 12/2000 | Rawlings |
| 6,170,879 B1 | 1/2001 | Rawlings |
| 6,179,202 B1 | 1/2001 | Alexander et al. |
| 6,196,447 B1 | 3/2001 | Purcell et al. |
| 6,220,504 B1 | 4/2001 | Flynn et al. |
| 6,223,977 B1 | 5/2001 | Hill |
| 6,237,844 B1 | 5/2001 | Purcell |
| 6,254,138 B1 | 7/2001 | Rawlings et al. |

| | | |
|---|---|---|
| 6,296,179 B1 | 10/2001 | Wortman |
| D451,131 S | 11/2001 | Okah Chegwe-Akigbe |
| 6,343,736 B1 | 2/2002 | Kim |
| 6,361,077 B1 | 3/2002 | Petkovsek |
| 6,435,404 B1 | 8/2002 | Feick |
| 6,612,484 B2 | 9/2003 | Rawlings et al. |
| 6,725,587 B2 | 4/2004 | Collins |
| D510,383 S | 10/2005 | Potter et al. |
| 6,966,484 B2 | 11/2005 | Calonje et al. |
| 6,983,875 B2 * | 1/2006 | Emmott ............... 229/313 |
| D536,375 S | 2/2007 | Potter et al. |
| 7,201,305 B1 | 4/2007 | Correa |
| 7,469,816 B2 * | 12/2008 | Rosenkranz et al. ........ 229/303 |
| 2002/0008135 A1 | 1/2002 | Kim |
| 2002/0023948 A1 | 2/2002 | Gillespie, IV |
| 2002/0030093 A1 | 3/2002 | Kim |
| 2002/0130169 A1 | 9/2002 | Purcell |
| 2003/0015581 A1 | 1/2003 | Purcell |
| 2004/0050918 A1 | 3/2004 | DeLaVergne |
| 2005/0045707 A1 | 3/2005 | Stude |
| 2005/0184140 A1 | 8/2005 | DeLa Vergne |
| 2006/0113367 A1 | 6/2006 | Emmott |
| 2006/0208053 A1 | 9/2006 | Emmott |
| 2006/0219769 A1 | 10/2006 | DeLaVergne |
| 2006/0266808 A1 | 11/2006 | DeLaVergne |
| 2008/0041928 A1 | 2/2008 | DeLaVergne |

FOREIGN PATENT DOCUMENTS

| | | |
|---|---|---|
| CA | 2138361 | 8/1999 |
| CH | 680124 A5 | 6/1992 |
| EP | 0 230 796 | 8/1987 |
| EP | 0 611 056 | 8/1994 |
| JP | 6-72446 | 3/1994 |
| JP | 2001-122287 | 5/2001 |
| WO | WO 93/19991 | 10/1993 |
| WO | WO 96/21598 | 7/1996 |
| WO | WO 00/10885 | 3/2000 |
| WO | WO 2004/076296 | 9/2004 |
| WO | WO 2007001193 A1 | 1/2007 |
| WO | WO 2007080395 A1 | 7/2007 |

* cited by examiner

REUSABLE ENVELOPE STRUCTURES AND METHODS

REFERENCE TO RELATED APPLICATIONS

This application claims the benefit of U.S. Provisional application Ser. No. 60/668,662, filed Apr. 5, 2005, entitled, "REUSABLE ENVELOPE STRUCTURES AND METHODS," which application is incorporated herein by reference in its entirety for all purposes.

TECHNICAL FIELD

The present invention is directed to reusable envelope structures. More particularly, the present invention is directed to reusable envelope structures that provide additional functions such as for advertising, promotion of goods and services, or general correspondence, for example.

BACKGROUND

One well-known type of envelope structure is a bangtail envelope. A bangtail envelope structure includes a flap or tail that is either removably attached to a closure flap of the envelope or a separate flap distinct from the closure flap of the envelope. In either case, the flap is designed so that it needs to be detached from the envelope in order to close the envelope with the closure flap. One application for such bangtail envelope structures is for return envelopes. Typically, return envelopes are used in a first mailed envelope for commercial activities such as the payment of bills, or the ordering of merchandise, or the like. For this type of use, the bangtail flap is generally sized to be larger than the closure flap, and can take the form of a return slip, coupon, or detachable order form, or it may simply be used as an advertising or promotion attachment to the return envelope. Upon receipt, the recipient can detach the bangtail flap and discard it, or use it as a part of the materials included in the return envelope.

SUMMARY

The present invention provides reusable envelope structures that can also provide advertising, feedback, billing, promotional, or other correspondence or bangtail-like functionality. The present invention also provides methods of using and methods of making such envelopes. In preferred aspects, the present invention provides envelope structures in which a single envelope structure can provide multiple uses.

A reusable envelope structure in accordance with the present invention comprises a reusable flap and a removable portion. The removable portion may comprise, for instance, a coupon or similar advertising, promotional, or correspondence device. In practical use, an envelope in accordance with the present invention is designed so that the envelope can be closed a first time by the reusable flap. Removal of the removable portion helps to open the envelope a first time by the reusable flap. When closed, a portion of the reusable flap is sealingly attached to the removable portion and also detaches when the portion of the reusable flap is removed when opening the envelope a first time. A remaining portion of the reusable flap can then be sealingly attached to the envelope to close the envelope a second time for reusing the envelope.

Accordingly, in one aspect of the present invention, a reusable envelope is provided. Generally, the envelope comprises an envelope body and a reusable sealing flap. The envelope body comprises at least first and second oppositely facing body panels. The first body panel comprises a removable portion capable of being separated from the first body panel. The removable portion is preferably defined by at least one line of weakness such as a perforation or the like. The reusable sealing flap comprises first and second flap portions separable from each other. Preferably, the first and second flap portions are separable along at least one line of weakness. The first flap portion is foldably attached to the second body panel of the envelope body and extends along a length of the second body panel of the envelope body. The second flap portion extends from the first flap portion and extends along a length of the first flap portion. The second flap portion is designed to be capable of being attached to the removable portion of the first body panel to close the envelope body a first time. In accordance with the present invention, the removable portion of the first body panel can be separated from the first body panel and the second flap portion can be separated from the first flap portion while attached to each other to help open the envelope body after being closed the first time. The first portion of the envelope can subsequently be used to close the envelope body a second time.

In another aspect of the present invention a method for reusing an envelope is provided. The method comprises providing an envelope having an envelope body comprising at least first and second oppositely facing body panels. The first body panel comprises a removable portion capable of being separated from the first body panel such as by a first line of weakness, for example. The first body panel also comprises a reusable sealing flap comprising first and second flap portions separable from each other such as along a second line of weakness, for example. The first flap portion is foldably attached to the second body panel of the envelope body and extends along a length of the second body panel of the envelope body. The second flap portion extends from the first flap portion and extends along a length of the first flap portion. The method also comprises attaching the second portion of the sealing flap to the envelope body to close the envelope body a first time, opening the envelope body by separating the removable portion of the first body panel from the first body panel and separating the second flap portion from the first flap portion while attached to each other, and attaching the first portion of the sealing flap to the envelope body to close the envelope a second time.

In another aspect of the present invention, a method of delivering a marketing device to a consumer is provided. The method comprises structurally integrating the marketing device with a reusable envelope so that separating the marketing device from the reusable envelope after the reusable envelope has been closed with an envelope flap a first time functions to open the reusable envelope at the envelope flap in a way that allows the envelope flap to be used to close the envelope a second time. The method also comprises sending the envelope to a consumer.

In yet another aspect of the present invention, a reusable envelope is provided. The reusable envelope comprises an envelope body and a reusable flap. The envelope body has a body panel and a removable panel attached to the body panel of the envelope body. The reusable flap comprises a first flap portion removably attached to a second flap portion. The first flap portion comprises a first adhesive region that sealingly mates with the removable panel to close the envelope body. The first flap portion and the removable panel can be detached from the body panel of the envelope body together to open the envelope. The second flap portion comprises a second adhesive region allowing the second flap to sealingly mate with a surface of the body panel of the envelope body after the first flap portion and the removable panel are detached from the body panel of the envelope body to close the envelope body an additional time.

BRIEF DESCRIPTION OF THE DRAWINGS

The accompanying drawings, which are incorporated in and constitute a part of this application, illustrate several aspects of the invention and together with the description of the embodiments serve to explain the principles of the invention. A brief description of the drawings is as follows.

DETAILED DESCRIPTION

Figure 1:
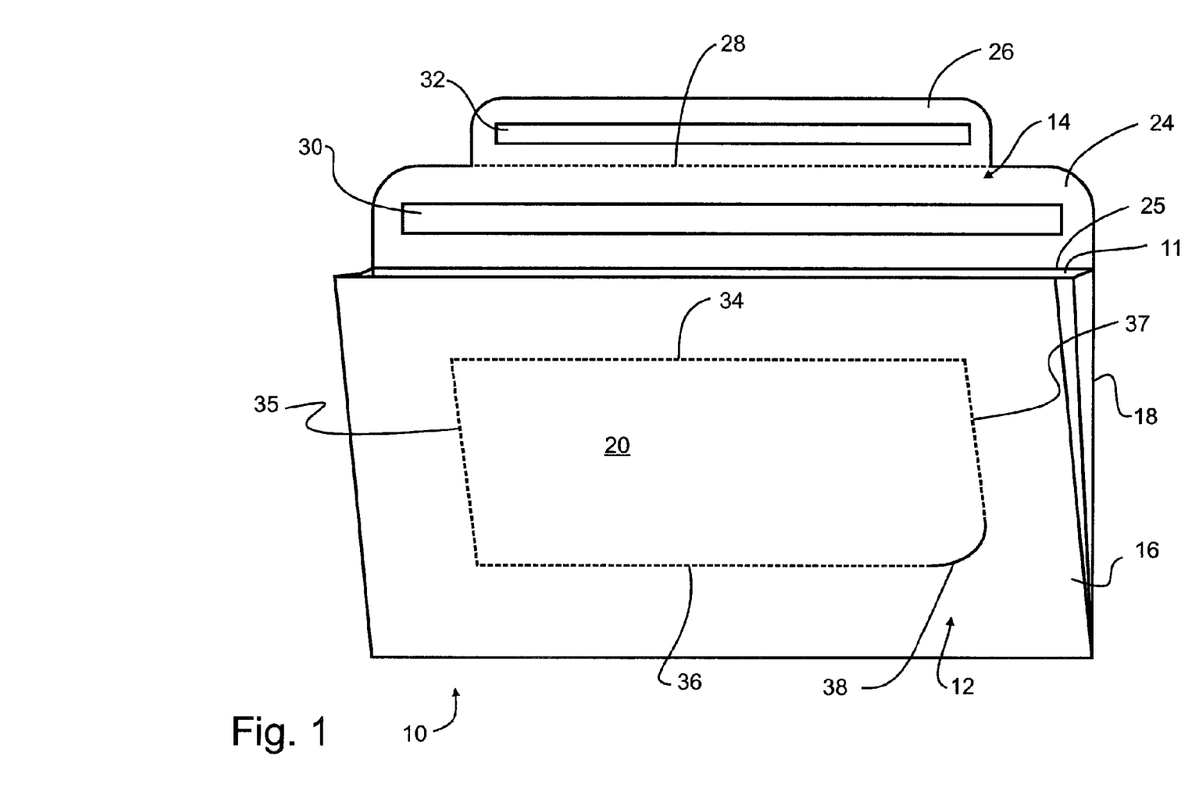
FIG. 1 is a perspective view of an exemplary envelope in accordance with the present invention showing in particular a reusable flap having first and second functional flap portions and a removable portion.
Figure 2:
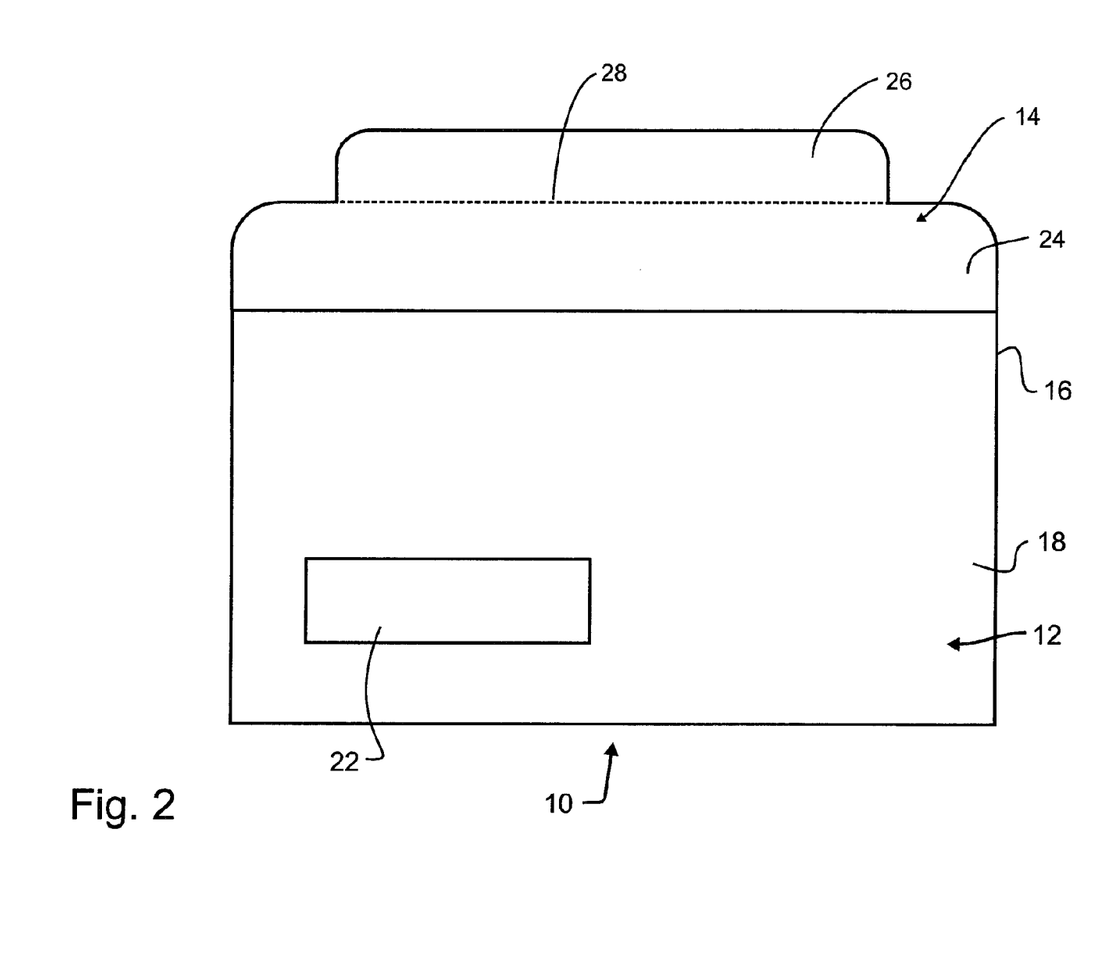
FIG. 2 is a perspective view of the opposite side of the envelope shown in FIG. 1 and showing in particular a window that can be used to display an address provided on contents positioned within the envelope.

Referring to FIGS. 1 and 2, an exemplary envelope 10 in accordance with the present invention is shown. Generally, the envelope 10 comprises an envelope body 12 and a reusable flap 14. The envelope body 12 comprises first and second oppositely facing panels, 16 and 18, that define an interior space 11 of the envelope body 12. The first panel 16 of the envelope body 12 comprises a removable portion 20 that is described in more detail below. Preferably, the second panel 18 of the envelope body 12 comprises a window 22, as can be seen in FIG. 2, which can be used to display a mailing address that is provided on correspondence located in the interior space of the envelope body 12. Optionally, such a window can be provided in the first panel 16 or both the first and second panels, 16 and 18, if desired. An envelope in accordance with the present invention, such as the envelope 10, can be addressed in any manner. For example, an address can be provided directly on the second panel 18 or indirectly by using well-known address labels or the like. Also, addressing techniques that use tear off portions as disclosed in Applicant's co-pending Non-Provisional U.S. patent application filed on Jul. 31, 2003 having Ser. No. 10/632,489 and entitled "Environmentally Friendly Reusable Envelope Structures" can be used. The disclosure of U.S. patent application Ser. No. 10/632,489 is fully incorporated by reference herein for all purposes.

The reusable flap 14 preferably comprises first and second flap portions, 24 and 26, that are designed to enable the envelope 10 to be reused one or more times. The first and second flap portions, 24 and 26, are separable from each other along a line of weakness, generally illustrated with a dashed line identified by reference numeral 28. Any presently known or future developed line of weakness capable of functioning to separate the first and second flap portions, 24 and 26, from each other can be used such as a single perforation line, a plurality of spaced perforation lines, a tear strip, a crease or fold line that provides a mechanical weakening, or the like. Also, the first and second flap portions, 24 and 26, preferably comprise separate adhesive regions, 30 and 32, respectively, that can be used to seal the first and second flap portions, 24 and 26, to the first panel 16 of the envelope body 12 for first and second uses of the envelope 10 as described further below. Adhesive regions, 30 and 32, are not required and any way of functionally closing the envelope 10 for mailing can be used.

The first flap portion 24 is foldably attached to the second panel 18 of the envelope body 12 along a fold line 25 and preferably extends along the entire length of the second panel 18, as illustrated. However, the first flap portion 24 is not required to extend along the entire length of the second panel 18 and may extend along any desired length of the second panel 18. The second flap portion 26 extends from the first flap portion 24, as shown. The second flap portion 26 preferably extends along the first flap portion 24 for a length less than the first flap portion 24 but can extend along the first flap portion 24 for any desired length including the entire length of the first flap portion 24. Other reusable flaps that can be used for the reusable flap 14 in accordance with the present invention are described in Applicant's co-pending Non-Provisional U.S. patent application filed on Jul. 31, 2003 having Ser. No. 10/632,489 and entitled "Environmentally Friendly Reusable Envelope Structures" and Applicant's co-pending Non-Provisional U.S. patent application filed on Feb. 24, 2005 having Ser. No. 11/064,791 and entitled "Reusable Envelope Structures and Methods." The disclosures of U.S. patent applications having Ser. Nos. 10/632,489 and 11/064,791 are each fully incorporated by reference herein for all purposes.

The removable portion 20 is preferably designed so that the removable portion 20 can be completely separated from the first panel 16 of the envelope body 12 in a way that does not affect the ability of the envelope 10 to function as a mailing device (for a return trip, for example). As illustrated, the first panel 16 includes lines of weakness, 34, 35, 36, and 37, that define the removable portion 20. The lines of weakness, 34, 35, 36, and 37, preferably comprise perforation lines but any line of weakness can be used as noted above with respect to the reusable flap 14. The removable portion 20 can have any desired shape and can be defined by any number of lines of weakness. Also, as illustrated, the removable portion 20 preferably comprises a tab 38 that is designed to help in separating the removable portion 20 from the first panel 16 of the envelope body 12. The tab 38 may comprise a precut region that can be grasped and pulled to help separate the removable portion 20 from the first panel 16 of the envelope body 12. Any number of tabs or similar regions may be used in any location for the purpose of helping to remove the removable portion 20.

In accordance with the present invention, the removable portion 20 preferably comprises information such as that used for advertising, marketing, promotions, product ordering, bill paying and the like. Particularly, the removable portion 20 can comprise any correspondence used with conventionally known bangtail type envelopes or the like. For example the removable portion 20 may comprise a return slip, coupon, detachable order form, or other similar correspondence.

Figure 3:
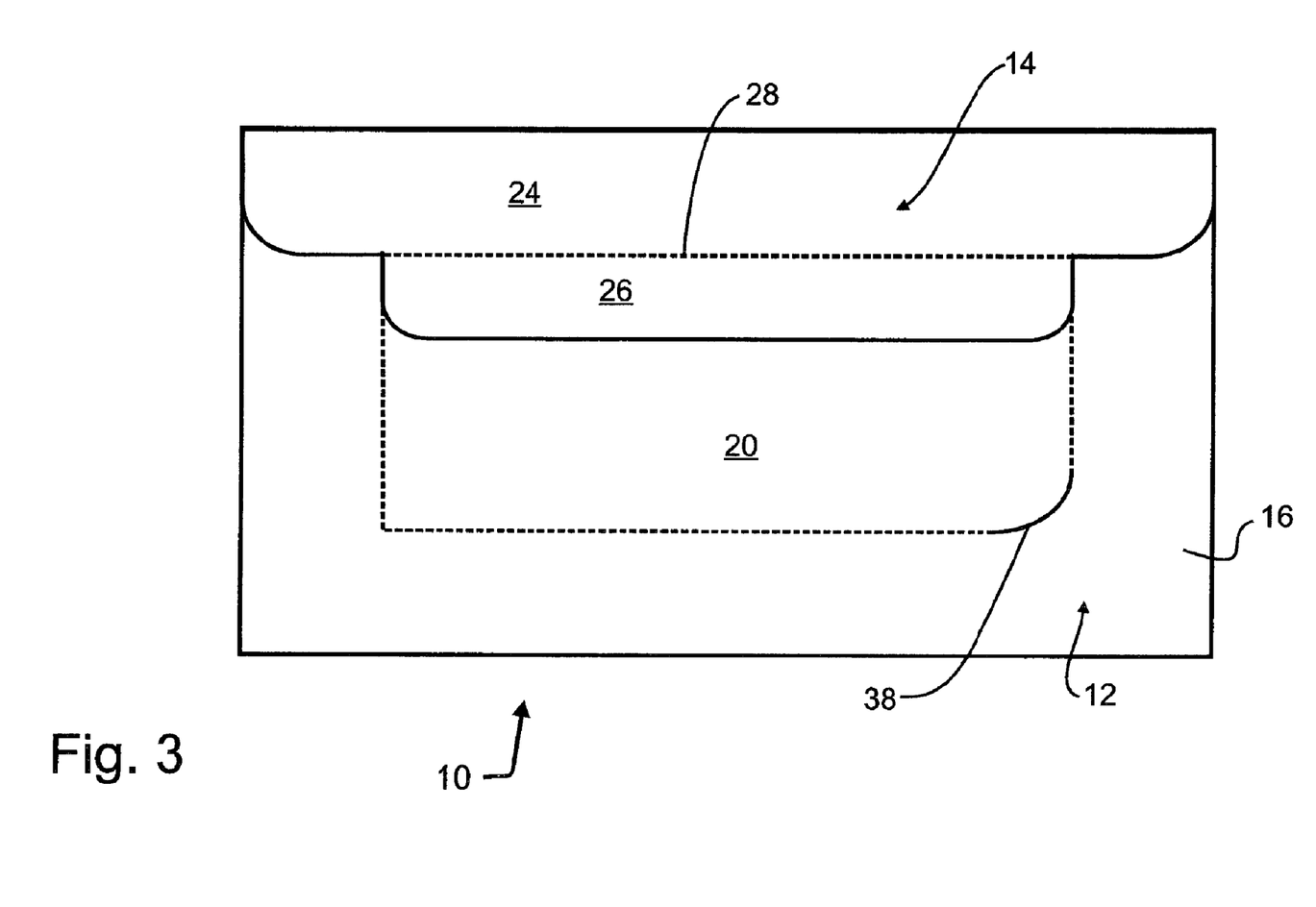
FIG. 3 is a plan view of the envelope of FIGS. 1 and 2 shown closed a first time with the second flap portion of the reusable flap attached to the removable portion of the envelope.
Figure 4:
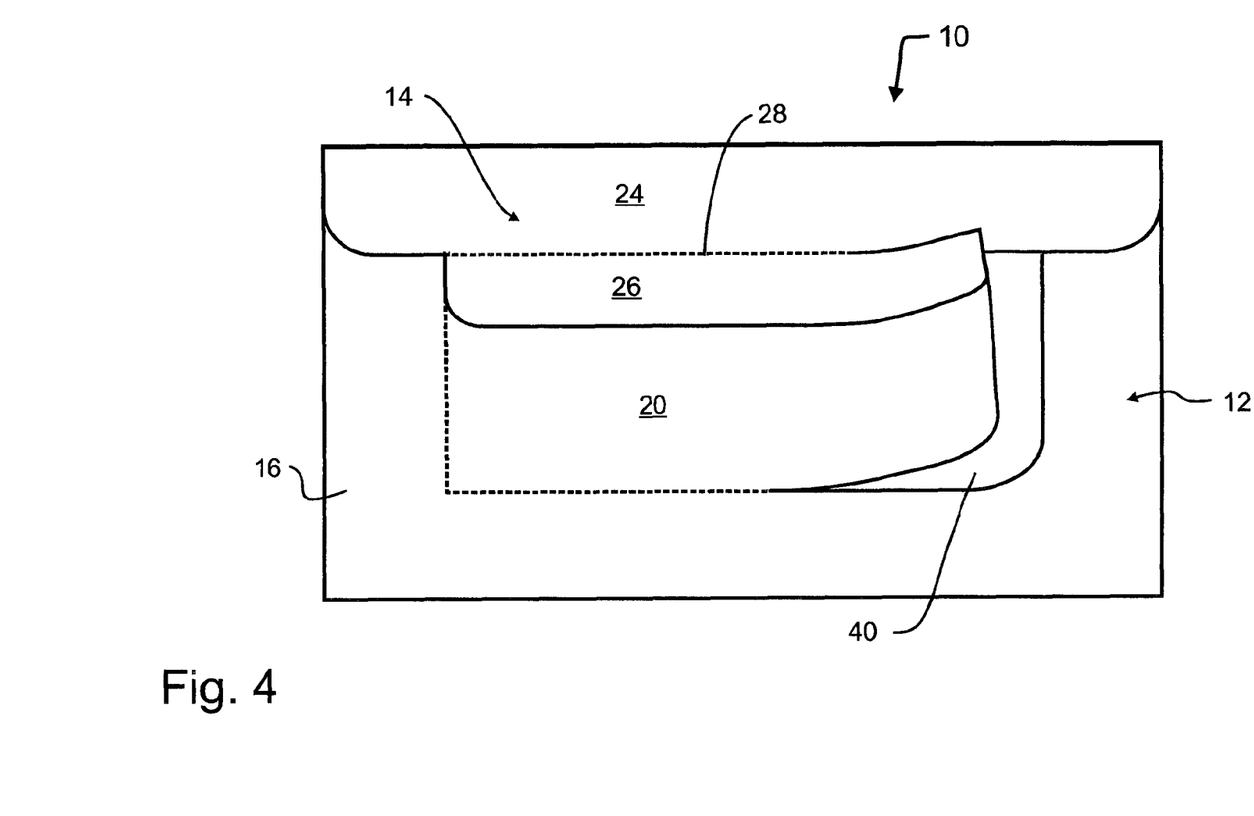
FIG. 4 is a plan view of the envelope of FIG. 3 shown with the removable portion partially removed and the second portion of the reusable flap partially separated from the first portion of the reusable flap thereby partially opening the envelope.

The removable portion 20 is designed so that the removable portion 20 can function to help open the envelope 10 after the envelope 10 has been closed a first time with the reusable flap 14. Referring to FIG. 3, the envelope 10 is shown as closed by the second flap portion 26 of the reusable flap 14 such as by using the adhesive region 32. As shown, the second flap portion 26 is sealingly attached to the removable portion 20. Preferably, when in this configuration, the line of weakness 28 of the reusable flap 14 and the line of weakness 34 of the removable portion 20 substantially overlap. This allows the second flap portion 26 to be separated from the first flap portion along the line of weakness 29 at the same time as the removable portion 20 is separated from the first panel 16 along the line of weakness 34 as shown in FIG. 4. After the envelope 10 is opened in this manner, the envelope 10 can be reused with the first flap portion 24.

In one preferred aspect of the present invention, the line of weakness 34 can be precut and does not need to be a line of weakness such as a perforation. That is, the removable portion 20 can be attached to the first panel 16 by perforations at the lines of weakness 35, 36, and 37 and the removable portion 20 can be pre-separated from the first panel 16 along the line of weakness 34. This can make it easier to remove the removable portion 20 and the second flap portion 26 together for opening the envelope 10 a first time.

Further referring to FIG. 4, removal of the removable portion 20 preferably reveals a backing panel 40. The backing panel may comprise any desired information such as a return address or information such as can be provided on the removable portion 20 as noted above, for example. The first panel 16 of the envelope body 12 and the removable portion 20 can be designed in any desired way to provide the backing panel 40 when the removable portion is removed. For example, the removable portion 20 can be defined in the first panel 16 and the backing panel 40 can be attached to an inside surface of the first panel 16 of the envelope body 12. Alternatively, the removable portion 20 can be defined in a panel that is attached to an outside surface of the first panel 16 of the envelope body 12. In this way, the first panel functionally provides the backing panel 40. It is contemplated however, that the backing panel 40 does not need to be used and contents of the envelope 10 can function as the backing panel 40.

Figure 5:
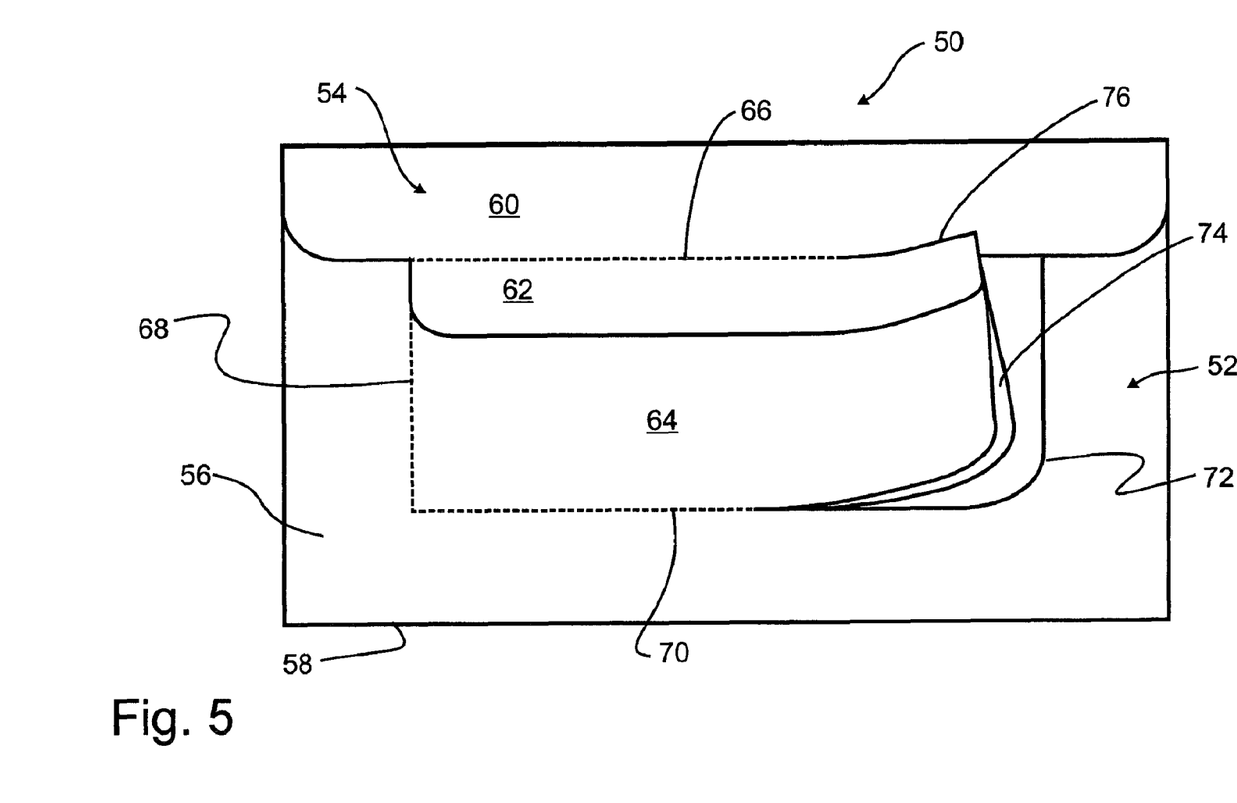
FIG. 5 is a plan view of an envelope in accordance with the present invention showing in particular a removable portion comprising a fold portion.

In FIG. 5, another exemplary reusable envelope 50 in accordance with the present invention is shown. The envelope 50 is preferably similar to the envelope 10 discussed above and preferably comprises a body 52 and a reusable flap 54, as illustrated. The body 52 comprises first and second panels, 56 and 58, respectively. Also, the reusable flap 54, as shown, comprises first and second flap portions, 60 and 62, respectively. In accordance with the present invention, the first panel 56 comprises a removable portion 64 (shown partially removed) that is defined by lines of weakness, 66 (separating the first and second flap portions), 68, 70, and 72 (shown as separated along line 72). The removable portion 64 comprises a fold portion 74 that is attached to the removable portion along fold line 76. The fold portion 74 can be attached to the removable portion 64 in other ways, however, such as by a line of weakness or with an adhesive, for example. In this way, the fold portion 74 can comprise information, such as private information, that is contained within the envelope body 52. The information can be any information as described above with respect to envelope 10.

Reusable envelopes and methods that may be used in accordance with the present invention are disclosed in Applicant's co-pending Non-Provisional U.S. patent application filed on Jul. 31, 2003 having Ser. No. 10/632,489 and entitled "Environmentally Friendly Reusable Envelope Structures" and Applicant's co-pending Non-Provisional U.S. patent application filed on Feb. 24, 2005 having Ser. No. 11/064,791 and entitled "Environmentally Friendly Reusable Envelope Structures." The disclosure of U.S. patent applications having Ser. Nos. 10/632,489 and 11/064,791 are each fully incorporated by reference herein for all purposes.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A reusable envelope having a first mailing configuration used during an original mailing and a second mailing configuration used during a return mailing, comprising:

an envelope body comprising at least first and second oppositely facing body panels, the first body panel comprising a permanent perimeter generally circumscribing a removable portion partially exposed on an exterior of said reusable envelope in said first mailing configuration and defined at least partially by a line of weakness, said removable portion line of weakness controllably separable from the first body panel to effect separation of said removable portion from a remainder of said first body panel; and a reusable sealing flap comprising first and second flap portions controllably separable from each other along a flap line of weakness, the first flap portion foldably attached to the second body panel of the envelope body and extending along a length of the second body panel of the envelope body, the second flap portion extending from the first flap portion and extending along a length of the first flap portion, the second flap portion in said first mailing configuration attached to at least a portion of the removable portion of the first body panel to close the envelope body a first time with said removable portion line of weakness and said flap line of weakness juxtaposed, said removable portion of the first body panel separable from the first body panel permanent perimeter and thereby effecting separation of the second flap portion from the first flap portion along said flap line of weakness while said second flap portion and said removable portion remain at least partially attached to each other to open the envelope body after being closed the first time, said first flap portion in said second mailing configuration affixed to said permanent perimeter.

2. The envelope of claim 1, wherein the line of weakness defining the removable portion comprises a perforation.

3. The envelope of claim 1, wherein the first and second flap portions are separable from each other along at least one line of weakness.

4. The envelope of claim 3, wherein the line of weakness for separating the second flap portion from the first flap portion comprises a tear strip.

5. The envelope of claim 1, wherein the removable portion of the first body panel comprises information.

6. The envelope of claim 5, wherein the information is readable from outside the envelope.

7. The envelope of claim 5, wherein the information comprises a coupon.

8. The reusable envelope of claim 1, further comprising a notch opened in said removable portion line of weakness distal to said juxtaposed flap line of weakness to facilitate manual separation of said removable portion from said body panel.

9. The reusable envelope of claim 1, wherein said removable portion line of weakness adjacent to said juxtaposed flap line of weakness is a line of separation between said removable portion and said body panel.

10. A reusable envelope comprising:

an envelope body having a body panel;

a removable panel attached to and generally circumscribed by the body panel of the envelope body along a line of weakness wherein the removable panel of the body panel of the envelope body comprises information; and a reusable flap having a first flap portion removably attached to a second flap portion along a line of weakness, the first flap portion comprising a first adhesive region that sealingly mates with the removable panel to simultaneously juxtapose said removable panel line of weakness with said reusable flap line of weakness and close the envelope body and whereby the first flap portion and the removable panel can be detached from the body panel of the envelope body together to open the envelope, the second flap portion comprising a second adhesive region allowing the second flap to sealingly mate with a surface of the body panel of the envelope body after the first flap portion and the removable panel are detached from the body panel of the envelope body to close the envelope body an additional time.

11. The reusable envelope of claim 10, wherein the removable panel line of weakness comprises a perforation.

12. The reusable envelope of claim 10, wherein the reusable flap line of weakness comprises a perforation.

13. The reusable envelope of claim 10, wherein the reusable flap line of weakness comprises a tear strip.

14. The reusable envelope of claim 10, wherein the information is readable from outside the envelope.

15. The reusable envelope of claim 10, wherein the information comprises a coupon.

* * * * *